(12) United States Patent
Tone

(10) Patent No.: US 10,530,687 B2
(45) Date of Patent: Jan. 7, 2020

(54) CONTROL SYSTEM AND PATH INFORMATION GENERATING METHOD

(71) Applicant: Mitsubishi Electric Corporation, Tokyo (JP)

(72) Inventor: Yuzuru Tone, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/476,112

(22) PCT Filed: Apr. 4, 2017

(86) PCT No.: PCT/JP2017/014138
§ 371 (c)(1),
(2) Date: Jul. 5, 2019

(87) PCT Pub. No.: WO2018/185854
PCT Pub. Date: Oct. 11, 2018

(65) Prior Publication Data
US 2019/0356585 A1    Nov. 21, 2019

(51) Int. Cl.
*H04L 12/28* (2006.01)
*H04L 12/723* (2013.01)
*H04L 29/08* (2006.01)

(52) U.S. Cl.
CPC .............. *H04L 45/50* (2013.01); *H04L 67/12* (2013.01)

(58) Field of Classification Search
None
See application file for complete search history.

(56) References Cited

U.S. PATENT DOCUMENTS

2008/0183976 A1    7/2008    Bliss et al.
2010/0205535 A1    8/2010    Mitamura et al.
(Continued)

FOREIGN PATENT DOCUMENTS

JP    2000-267710 A    9/2000
JP    2000-268016 A    9/2000
(Continued)

OTHER PUBLICATIONS

International Search Report and Written Opinion dated Jun. 27, 2017 for PCT/JP2017/014138 filed on Apr. 4, 2017, 9 pages including English Translation of the International Search Report.
(Continued)

*Primary Examiner* — Gerald A Smarth
(74) *Attorney, Agent, or Firm* — Xsensus LLP

(57) ABSTRACT

A path information generating device includes: a label information storage unit that stores label information indicating correspondence relations between label names and control devices; a system configuration information storage unit that stores system configuration information indicating correspondence relations between the control devices and networks connected to the control devices; and a path information generating unit that generates path information indicating a path from an access source control device to a first control device based on the system configuration information, and outputs the generated path information. The path information generating unit receives a first label name for designating an access destination, identifies the first control device corresponding to the first label name based on the label information, and sets the first control device as an access destination control device.

10 Claims, 10 Drawing Sheets

(56) References Cited

U.S. PATENT DOCUMENTS

| | | | |
|---|---|---|---|
| 2011/0075549 A1* | 3/2011 | Lu | G06F 11/1415 370/216 |
| 2013/0121208 A1 | 5/2013 | Okamoto | |
| 2015/0001899 A1* | 1/2015 | Line | B60R 7/043 297/188.04 |
| 2015/0227959 A1* | 8/2015 | Qu | G06Q 30/0239 235/375 |
| 2015/0236901 A1 | 8/2015 | Nagashima | |
| 2016/0171254 A1* | 6/2016 | Yoshida | G06K 1/121 235/494 |
| 2017/0053317 A1* | 2/2017 | Dione | G06Q 30/02 |
| 2017/0287246 A1* | 10/2017 | Baek | G06K 7/10366 |

FOREIGN PATENT DOCUMENTS

| | | |
|---|---|---|
| JP | 2005-130147 A | 5/2005 |
| JP | 2008-004087 A | 1/2008 |
| JP | 2008-210377 A | 9/2008 |
| JP | 2009-265968 A | 11/2009 |
| JP | 2012-108568 A | 6/2012 |
| JP | 2013-106077 A | 5/2013 |
| JP | 2013-246569 A | 12/2013 |
| JP | 5701462 B2 | 4/2015 |
| WO | 2008/146380 A1 | 12/2008 |
| WO | 2011/083565 A1 | 7/2011 |

OTHER PUBLICATIONS

Notification of Reasons for Refusal received for Japanese Patent Application No. 2018-508247, dated Oct. 2, 2018, 7 pages including English Translation.

Notification of Reasons for Refusal received for Japanese Patent Application No. 2018-508247, dated Jul. 10, 2018, 8 pages including English Translation.

Notification of Reasons for Refusal received for Japanese Patent Application No. 2018-508247, dated Apr. 17, 2018, 8 pages including English Translation.

Decision to Grant a Patent received for Japanese Patent Application No. 2018-508247, dated Dec. 11, 2018, 5 pages including English Translation.

* cited by examiner

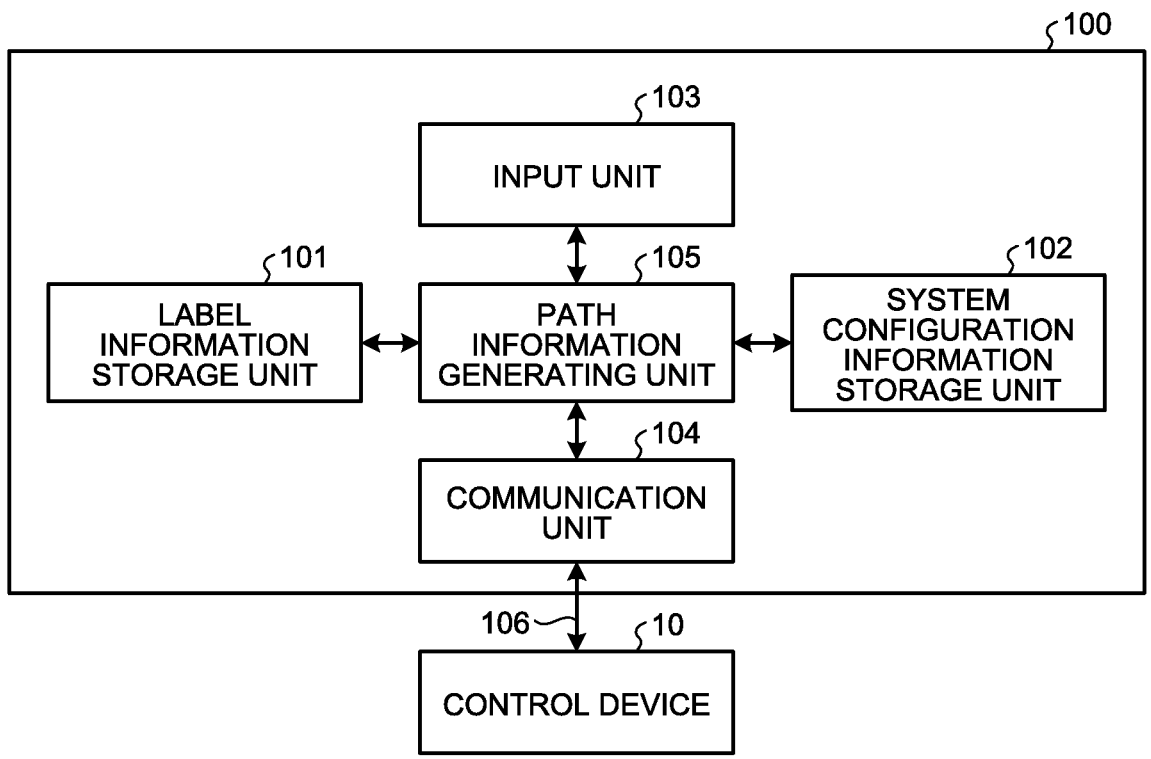

| CONTROL DEVICE IDENTIFICATION INFORMATION | NETWORK ID |
|---|---|
| CONTROL DEVICE 10-1 | COMMUNICATION NETWORK 22 |
| CONTROL DEVICE 10-2 | COMMUNICATION NETWORK 21 |
| CONTROL DEVICE 10-3 | COMMUNICATION NETWORK 21, COMMUNICATION NETWORK 22 |

| LABEL NAME | CONTROL DEVICE IDENTIFICATION INFORMATION |
|---|---|
| LABEL1 | CONTROL DEVICE 10-2 |
| LABEL2 | CONTROL DEVICE 10-3 |
| Flow1 | CONTROL DEVICE 10-3 |
| Stat_Switch | CONTROL DEVICE 10-3 |
| Stop_Switch | CONTROL DEVICE 10-3 |
| LABEL3 | CONTROL DEVICE 10-1 |
| Velocity1 | CONTROL DEVICE 10-1 |
| Error1 | CONTROL DEVICE 10-1 |
| Error2 | CONTROL DEVICE 10-1 |

# CONTROL SYSTEM AND PATH INFORMATION GENERATING METHOD

CROSS-REFERENCE TO RELATED APPLICATIONS

The present application is based on PCT filing PCT/JP2017/014138, filed Apr. 4, 2017, the entire contents of which are incorporated herein by reference.

FIELD

The present invention relates to a path information generating device, a path information generating method, and a program for generating path information to be used in communication between control devices in a control system including a plurality of control devices.

BACKGROUND

Automatic control of devices in production lines, plants, and the like is generally performed using a control device such as a programmable logic controller (PLC) and a human machine interface (HMI). In recent years, a large-scale control system including a plurality of control devices coupled to one another via a network has also been developed. Such a control system can have a configuration in which two or more control devices are accommodated in one network, or a configuration in which two or more networks are connected to one another.

In a control system including a plurality of control devices, label names may be sometimes used. A label name is a character string associated with a control device. Each label name is assigned with a freely-selected character string, e.g. a character string that means the name of the control device. A label name may also be used as a variable in a program. In order to improve program readability, a character string indicating the content of a variable is often used as a label name.

The control devices communicate with one another to exchange information necessary for their control. Such communication is performed based on memory accesses for reading information from a memory equipped in a control device and writing information in a memory. In order to perform a memory access, an access source control device needs to store path information indicating a path to an access destination control device. Conventionally, such path information has been manually generated by a user, and the generated path information has been manually written in each control device. Manual generation of path information is inefficient and error-prone.

Patent Literature 1 discloses a device that automatically creates path information indicating a path between control devices. In response to an identifier (ID) of a control device being designated, the device disclosed in Patent Literature 1 generates network routing information that is path information for the designated control device, based on network configuration information. Thus, it is possible to efficiently generate the path information and prevent erroneous path information from being generated.

CITATION LIST

Patent Literature

Patent Literature 1: Japanese Patent Application Laid-open No. 2000-267710

SUMMARY

Technical Problem

It is conceivable that the technique described in Patent Literature 1 mentioned above may use the above-described label name of a control device instead of the ID thereof. However, the technique described in Patent Literature 1 above uses network configuration information including a network ID, a node ID, a unit ID, and the like for a PLD ID which is the ID of a control device. Therefore, in order to give two or more label names to a control device or in order to change the label name having been given to a control device to another label name, the entire network configuration information needs to be manually rewritten, and so there have still been a lot of time and effort.

The present invention has been made in view of the above circumstances, and an object thereof is to provide a path information generating device, a path information generating method, and a program, which are capable of reducing the time and effort required to generate path information.

Solution to Problem

In order to solve the above-mentioned problems and achieve the object, a path information generating device according to the present invention has: a label information storage unit to store label information; a system configuration information storage unit to store system configuration information; and a path information generating unit to generate path information indicating a path from an access source control device to a first control device based on the system configuration information, and to output the path information generated. The path information generating unit receives a first label name for designating an access destination, identifies a first control device corresponding to the first label name based on the label information, and sets the first control device as the access destination control device.

Advantageous Effects of Invention

The path information generating device, the path information generating method, and the program according to the present invention are able to achieve the effect of reducing the time and effort required to generate path information.

BRIEF DESCRIPTION OF DRAWINGS

FIG. 1 is a diagram illustrating a functional configuration of a path information generating device according to a first embodiment of the present invention.

FIG. 2 is a diagram illustrating label information stored in a label information storage unit illustrated in FIG. 1.

DESCRIPTION OF EMBODIMENTS

Figures 3, 4:
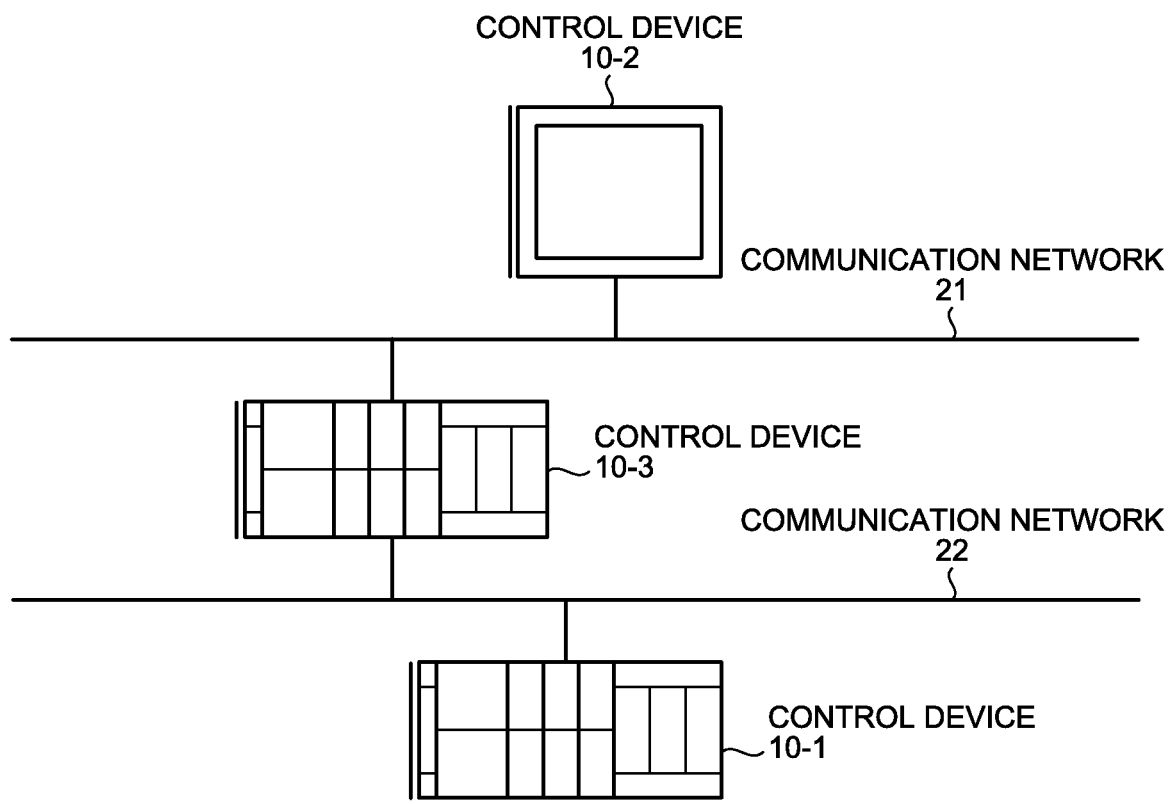
FIG. 3 is a diagram illustrating system configuration information stored in a system configuration information storage unit illustrated in FIG. 1.
FIG. 4 is a diagram schematically illustrating a system configuration indicated by the system configuration information illustrated in FIG. 3.

Hereinafter, a path information generating device, a path information generating method, and a program according to embodiments of the present invention will be described in detail with reference to the drawings. The present invention is not necessarily limited by these embodiments.

First Embodiment

FIG. 1 is a diagram illustrating a functional configuration of a path information generating device according to the first embodiment of the present invention. The path information generating device 100 according to the present embodiment includes a label information storage unit 101, a system configuration information storage unit 102, an input unit 103, a communication unit 104, and a path information generating unit 105. The communication unit 104 is coupled to a control device 10 via a connection cable 106. The path information generating device 100 generates path information indicating a path for an access source control device 10 to communicate with an access destination control device 10. The path information includes information, e.g. address information, for identifying the access source control device 10 and the access destination control device 10, and information for identifying a network constituting a path from the access source control device 10 to the access destination control device 10.

The label information storage unit 101 stores label information indicating correspondence relations between the control devices 10 and label names that are character strings associated with the control devices 10. FIG. 2 is a diagram illustrating the label information stored in the label information storage unit 101 illustrated in FIG. 1. The label information includes label names and control device identification information for identifying control devices. In the present embodiment, label name is a character string uniquely identifying a control device 10, and one label name is associated with one control device 10. In the example illustrated in FIG. 2, label names "LABEL 1", "LABEL 2", and "LABEL 3" are associated with the control devices 10-1, 10-2, and 10-3, respectively. A freely-selected character string can be used as a label name. For example, a meaningful character string indicating a role, an installation location, or the like of the control device 10 can be used for the label name. The control device identification information is information having any combination of at least one of alphabetic characters, numerals, and codes. For example, the control device identification information is the network addresses of the control devices 10, hardware identification information assigned at manufacturing stages of the control devices, or the like.

The system configuration information storage unit 102 stores system configuration information indicating the system configuration of the control system constituted by the control devices 10. FIG. 3 is a diagram illustrating the system configuration information stored in the system configuration information storage unit 102 illustrated in FIG. 1. The system configuration information illustrated in FIG. 3 includes control device IDs and network IDs. Network IDs are associated with control device IDs, and the control device 10 indicated by each control device ID is connected to the network indicated by the associated network ID. The control device 10-1 is connected to a communication network 22. The control device 10-2 is connected to a communication network 21. The control device 10-3 is connected to the communication network 21 and the communication network 22. FIG. 4 is a diagram schematically illustrating the system configuration indicated by the system configuration information illustrated in FIG. 3. It can be seen from the correspondence relations between the control devices and the communication networks indicated by the system configuration information in FIG. 3 that the control system constituted by the control devices 10 has the system configuration schematically illustrated in FIG. 4.

The input unit 103 includes an input device such as a keyboard or a pointing device. Once the user operates the input device, the input unit 103 generates input information according to the operation and outputs the input information to the path information generating unit 105.

The communication unit 104 is an input/output interface with an external device. The communication unit 104 can be coupled to the control device 10 via a connection cable, for example.

The path information generating unit 105 generates path information using a designated label name, the label information stored in the label information storage unit 101, and the system configuration information stored in the system configuration information storage unit 102.

Figure 5:
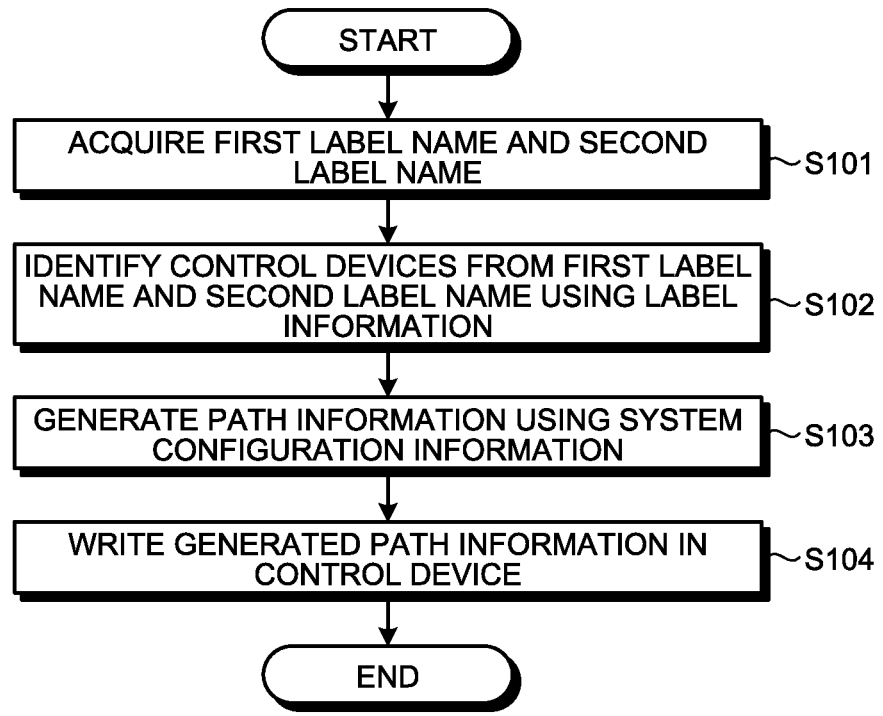
FIG. 5 is a flowchart for explaining a path information generating operation.

FIG. 5 is a flowchart for explaining path information generating operation. An operation example of the path information generating unit 105 will be described with reference to FIG. 5.

For example, once the user operates the input unit 103 of the path information generating device 100, a path information generating process is started. In response to the user designating a first label name which is the label name of the access destination control device 10 and a second label name which is the label name of the access source control device 10 using the input unit 103, the path information generating unit 105 acquires the designated first and second label names from the input unit 103 (step S101). Using the label information stored in the label information storage unit 101, the path information generating unit 105 identifies control devices 10 from the first label name and the second label name (step S102). Specifically, using the label information, the path information generating unit 105 identifies the first control device corresponding to the first label name and the second control device corresponding to the second label name. For example, when "LABEL1" is designated as the first label name and "LABEL2" is designated as the second label name, the path information generating unit 105 identifies the control device 10-1 as an access destination control device and identifies the control device 10-2 as an access source control device.

Using the system configuration information stored in the system configuration information storage unit 102, the path information generating unit 105 generates path information indicating a path from the second control device to the first control device (step S103). Specifically, the path information generating unit 105 generates path information indicating the path from the control device 10-2 to the control device 10-1 through the communication network 21, the control device 10-3, and the communication network 22 in this order. The path information generating unit 105 writes the generated path information in the control device 10 coupled thereto via the communication unit 104 (step S104). Specifically, the path information generating unit 105 generates path information according to a determined format, and outputs the generated path information to the control device 10, thereby writing the path information in the control device 10. For example, once the user connects the control device 10-2 which is the access source control device 10 to the communication unit 104, the path information can be written in the control device 10-2.

Figure 6:
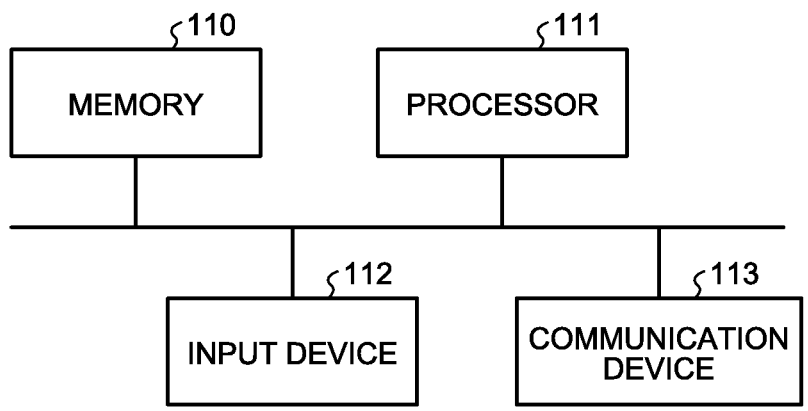
FIG. 6 is a diagram illustrating an exemplary hardware configuration of the path information generating device.

FIG. 6 is a diagram illustrating an exemplary hardware configuration of the path information generating device 100. Each function of the path information generating device 100 is realized using a computer including a memory 110, a processor 111, an input device 112, and a communication device 113. The memory 110 is a storage device that stores a computer program to be executed by the processor 111 and information to be used for execution of the computer program. For example, the memory 110 can store the label information and the system configuration information as information to be used for execution of the computer program. The processor 111 reads out the computer program from the memory 110 and executes the read computer program. The memory 110 stores the computer program in which the path information generating procedure illustrated in FIG. 5 is described, while the processor 111 can realize the function of the path information generating unit 105 by executing this computer program. The input device 112 is, for example, a keyboard or a pointing device. The input device 112 can realize the function for the input unit 103 by cooperating with the processor 111. The communication device 113 is a communication interface for connecting to an external device via a communication network. The communication device 113 can realize the function of the communication unit 104 by cooperating with the processor 111.

According to the first embodiment, in response to the user designating the first label name and the second label name using the input unit 103, path information indicating a path from the second control device 10 corresponding to the second label name to the first control device 10 corresponding to the first label name is automatically generated. At this time, the path information generating unit 105 performs the processing of identifying the control devices 10 from the label names using the label information in which label names are associated with the control devices 10. The path information generating unit 105 also generates path information using the system configuration information. As described above, after the user designates a label name, path information is generated without manual intervention. The user does not need to investigate the control devices corresponding to the label names with use of human work in order to generate path information, and the user does not need to generate path information from the system configuration. Therefore, the time and effort required to generate path information can be reduced. The generated path information is written in the control device 10 coupled via a connection cable. This configuration eliminates the need to manually write in the control device 10, and thus can save time and effort on manual work. In addition, even when the label name of the control device 10 has been changed to another label name, it only has to rewrite the label information, thereby making it possible to save time and effort on manually rewriting the network configuration information.

Second Embodiment

Figures 7, 8:
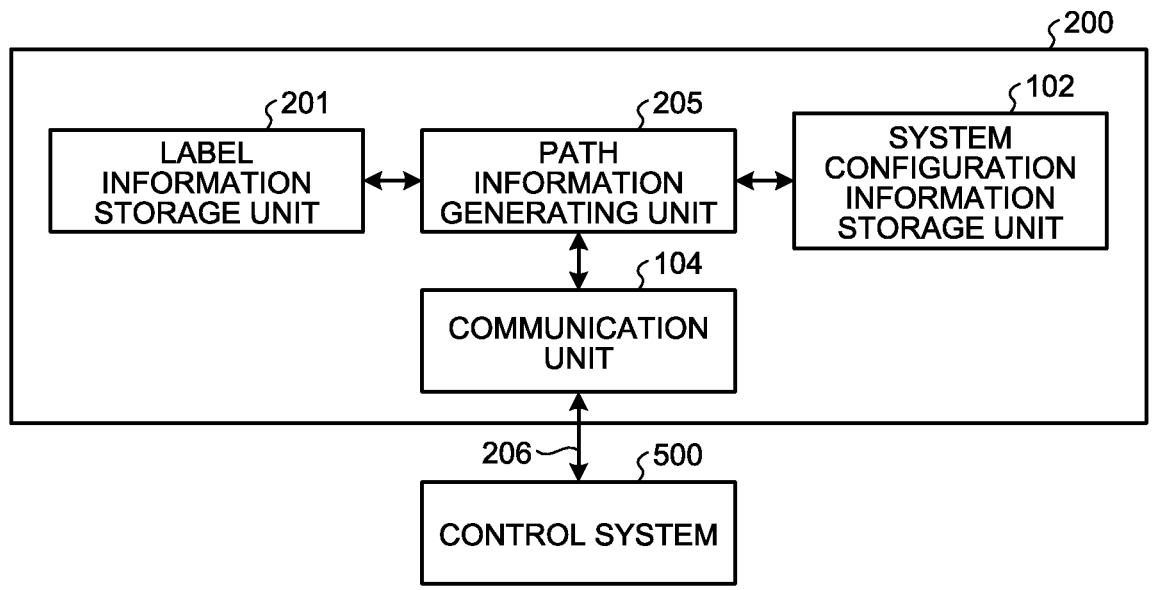
FIG. 7 is a diagram illustrating a functional configuration of a path information generating device according to a second embodiment of the present invention.
FIG. 8 is a diagram illustrating label information stored in a label information storage unit illustrated in FIG. 7.

FIG. 7 is a diagram illustrating a functional configuration of a path information generating device according to the second embodiment of the present invention. The path information generating device 200 according to the second embodiment includes a label information storage unit 201, the system configuration information storage unit 102, the communication unit 104, and a path information generating unit 205. The communication unit 104 is coupled to a control system 500 via a communication network 206. Hereinafter, differences from the path information generating device 100 will mainly be described.

The label information storage unit 201 stores label information indicating the correspondence relations between the control devices 10 and label names that are character strings associated with the control devices 10. FIG. 8 is a diagram illustrating the label information stored in the label information storage unit illustrated in FIG. 7. The label information includes label names and control device identification information for identifying control devices. In the second embodiment, a label name is used as a variable used by a program for operating the control devices 10. Two or more label names are associated with one control device 10. In recent years, programs that use label names have been spreading. Such a program is described using a label name, and the label name is converted to a memory address corresponding to a variable at the time of compiling. By using a character string indicating the contents of data as a label name, program readability is improved.

In the example illustrated in FIG. 8, label names "LABEL3", "Velocity1", "Error1", and "Error2" are associated with the control device 10-1. Label name "LABEL1" is associated with the control device 10-2. Label names "LABEL2", "Flow1", "Stat_Switch", and "Stop_Switch" are associated with the control device 10-3.

The path information generating unit 205 generates path information based on the label names designated by an inquiry source device in the control system 500 coupled thereto via the communication unit 104.

Figure 9:
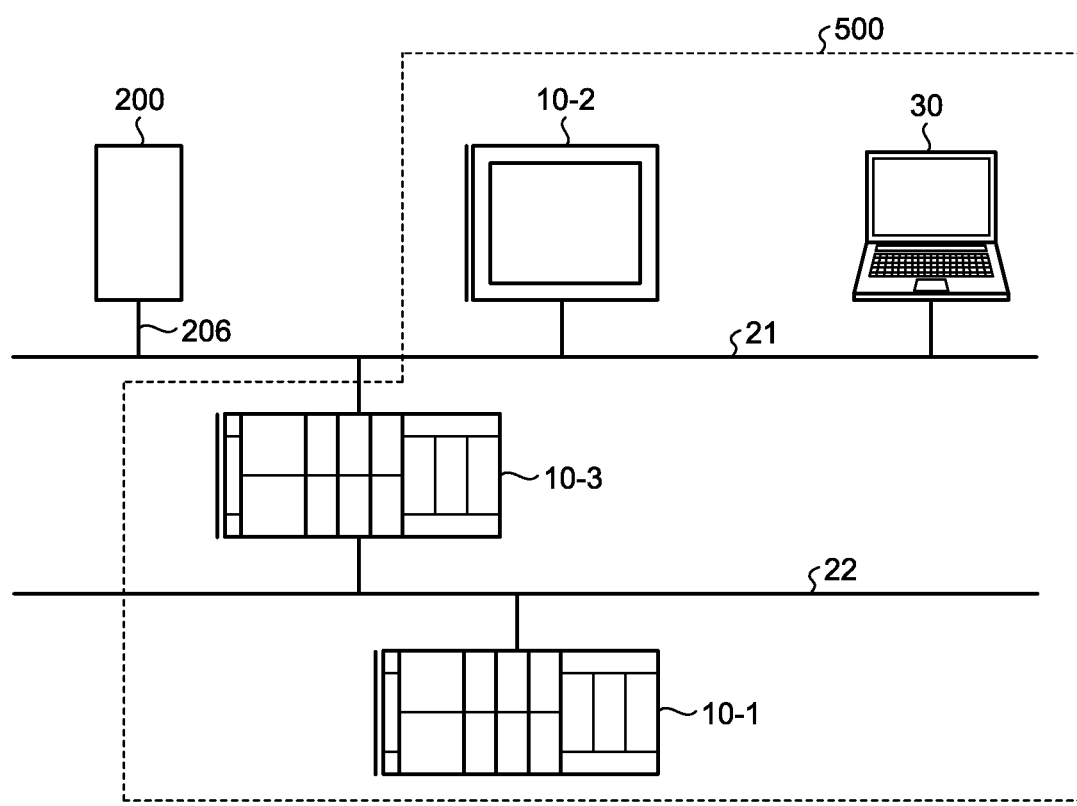
FIG. 9 is a diagram schematically illustrating a configuration of a control system illustrated in FIG. 7.

FIG. 9 is a diagram schematically illustrating a configuration of the control system 500 illustrated in FIG. 7. The control system 500 includes the control device 10-1, the control device 10-2, the control device 10-3, and a programming device 30. The path information generating device 200 is coupled to the control system 500 via the communication network 206. The control device 10-1 is connected to the communication network 22. The control device 10-2 is connected to the communication network 21. The control device 10-3 is connected to the communication network 21 and the communication network 22. The programming device 30 is connected to the communication network 21, for example.

The programming device 30 is a device for creating a program in which the operations of the control devices 10 are described. This program is stored in a storage unit (not illustrated). The program owned by the programming device 30 includes information indicating which control device 10 performs memory access to which control device 10, that is, which control device 10 requires path information for which control device 10. In the present embodiment, the programming device 30 functions as an inquiry source device that inquires of the path information generating device 200 about path information. The programming device 30 writes, in the access source control device 10, the path information obtained as the result of the inquiry. As a result, the access source control device 10 can access the access destination control device 10, using the written path information.

Figure 10:
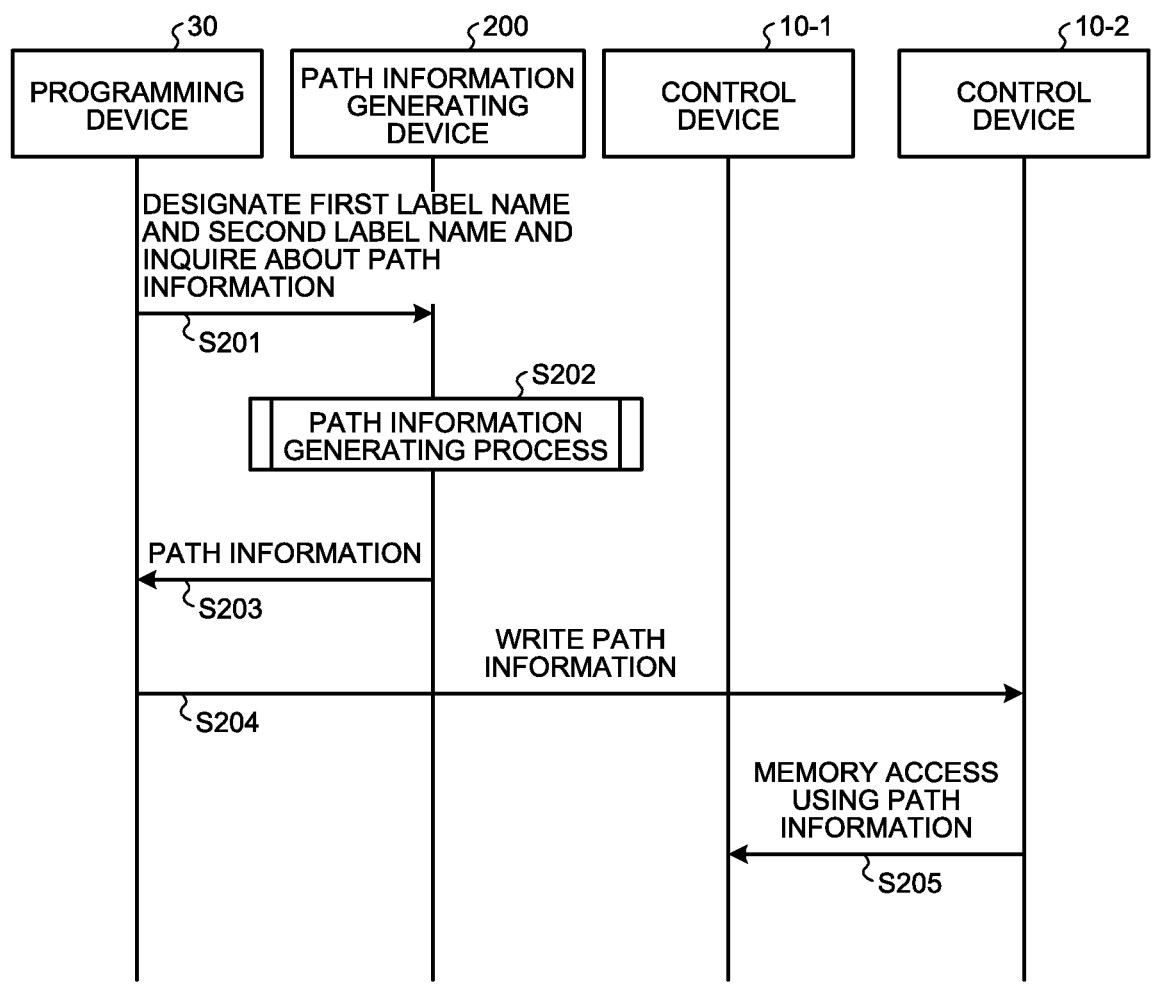
FIG. 10 is a sequence diagram for explaining a path information generating operation according to the second embodiment.

FIG. 10 is a sequence diagram for explaining a path information generating operation according to the second embodiment. This operation is based on the premise that the programming device 30 stores a program in which the operation of the control device 10-2 is described, and the operation of the control device 10-2 to perform memory access to the control device 10-1 is described in the program.

The programming device 30 designates the first label name and the second label name and inquires of the path information generating device 200 about path information (step S201). The path information generating device 200 performs a path information generating process based on the first and second label names designated by the programming device 30 (step S202). Specifically, in the path information generating process illustrated in step S202, processing shown in steps S101 to S103 in FIG. 5 is performed. Upon generating path information, the path information generating device 200 outputs the generated path information to the programming device 30 which is the inquiry source device (step S203).

When receiving the path information outputted by the path information generating device 200, the programming device 30 writes the received path information in the control device 10-2 which is the second control device 10 (step S204). The control device 10-2 performs memory access to the control device 10-1 using the path information written from the programming device 30 (step S205).

The programming device 30 repeats an operation similar to that explained with reference to FIG. 10 for a plurality of memory access operations described in the program. In a case where the programming device 30 has a program for operating all the control devices 10 owned by the control system 500, the above-described configuration enables the generation of path information for all the memory access operations to be performed in the control system 500, and enables the storage of the resultant path information in the access source control device 10.

Also in the second embodiment, the programming device 30 designates the first label name and the second label name for inquiry, whereby path information is generated. According to this configuration, even in a case where label names are used as variables of a program for operating the control devices 10, path information can be generated from the label names. Therefore, path information is generated without any user's operation for identifying control devices from the information described in the program. Therefore, the time and effort required to generate path information can be reduced. In this example, the programming device 30 holds a program for operating the control devices 10 included in the control system 500. Since the program for operating the control devices 10 includes particular information indicating which control device 10 performs memory access to which control device, necessary path information can be accurately generated by using this particular information to generate the path information. In addition, even in the case where two or more label names are provided to one control device 10, it only has to rewrite the label information, and it possible to save time and effort on manually rewriting the network configuration information.

Third Embodiment

Figure 11:
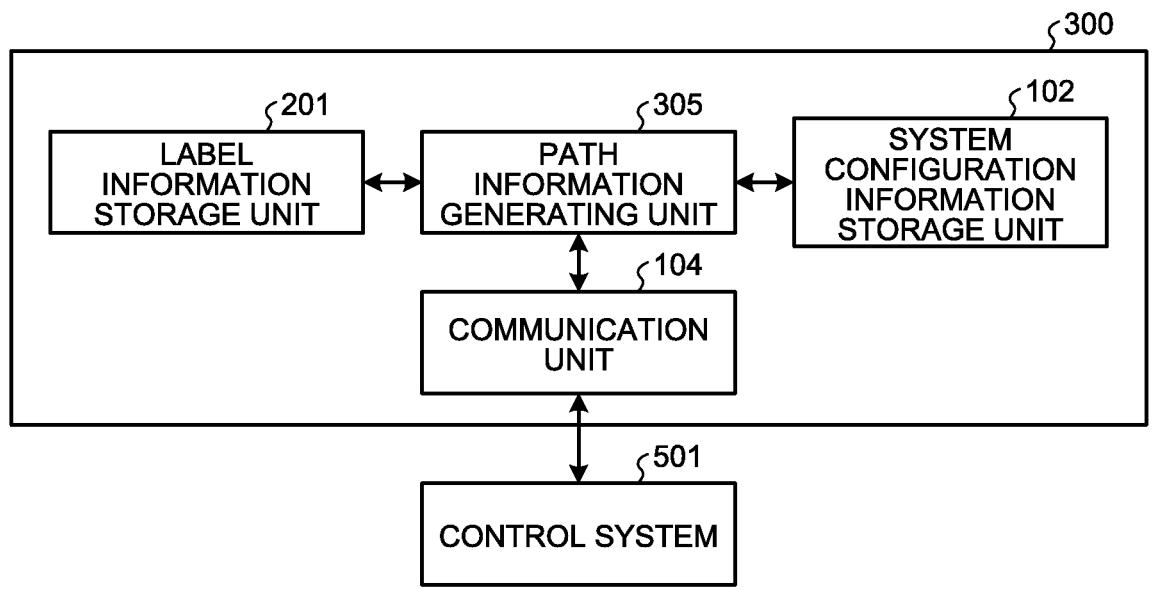
FIG. 11 is a diagram illustrating a functional configuration of a path information generating device according to a third embodiment of the present invention.

FIG. 11 is a diagram illustrating a functional configuration of a path information generating device according to the third embodiment of the present invention. The path information generating device 300 according to the present embodiment includes the label information storage unit 201, the system configuration information storage unit 102, the communication unit 104, and a path information generating unit 305. The path information generating device 300 is coupled to a control system 501 via a communication network. Hereinafter, differences from the second embodiment will mainly be described.

Figure 12:
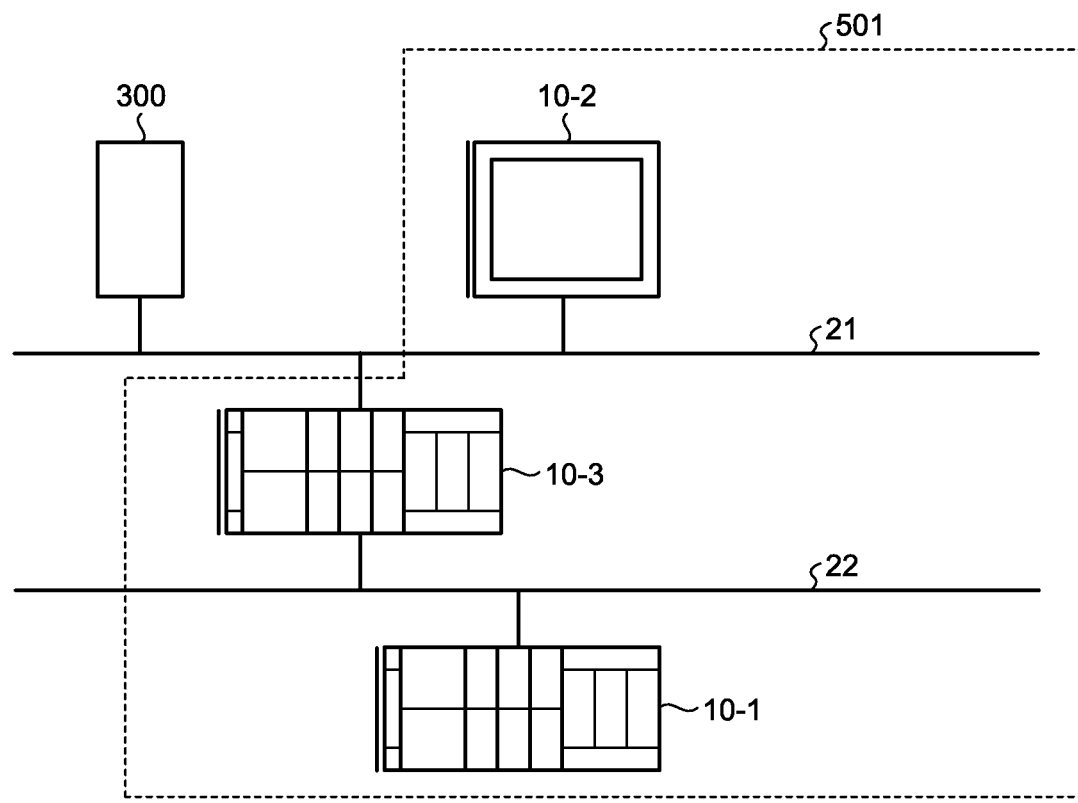
FIG. 12 is a diagram schematically illustrating a configuration of a control system illustrated in FIG. 11.

The communication unit 104 is coupled to the control system 501 via a communication network. FIG. 12 is a diagram schematically illustrating a configuration of the control system illustrated in FIG. 11. The control system 501 includes the control device 10-1, the control device 10-2, and the control device 10-3. The control device 10-1 is connected to the communication network 22. The control device 10-2 is connected to the communication network 21. The control device 10-3 is connected to the communication network 21 and the communication network 22.

In the third embodiment, an inquiry source device that inquires of the path information generating device 300 about path information is one of the control devices 10 included in the control system 501. When the control device 10 designates the first label name and the second label name and inquires of the path information generating device 300 about path information, the path information generating unit 305 generates path information using the designated first and second label names. When the control device 10 designates the first label name without designating the second label name and inquires of the path information generating device 300 about path information, the path information generating unit 305 determines that the inquiry source device is an access source control device, and accordingly generates path information.

Figure 13:
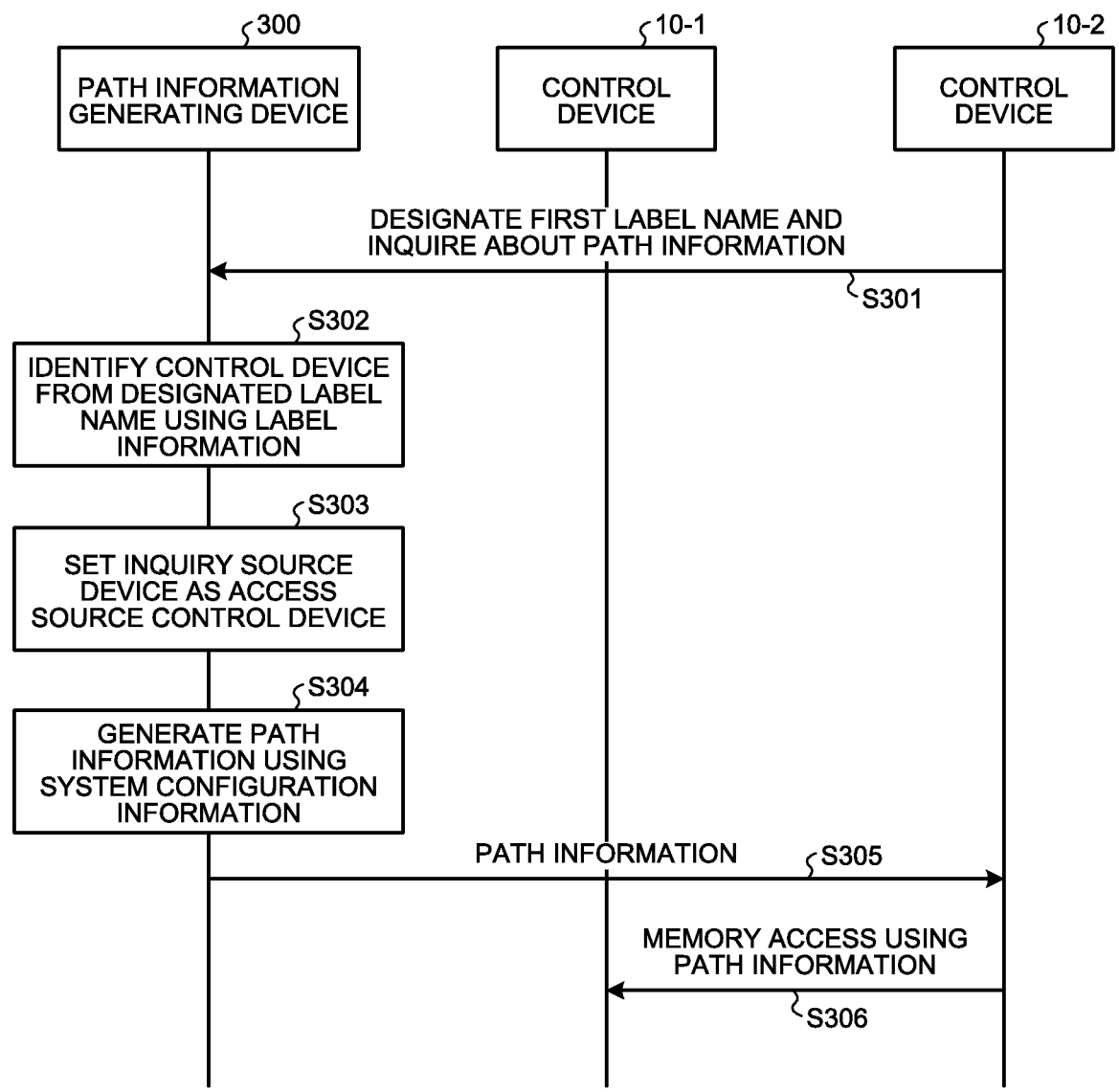
FIG. 13 is a sequence diagram for explaining a path information generating operation according to the third embodiment.

FIG. 13 is a sequence diagram for explaining a path information generating operation according to the third embodiment. FIG. 13 illustrates an example in which the control device 10-2 that is an inquiry source device inquiries of the path information generating device 300 about path information indicating a path from the control device 10-2 that is an access source control device to the control device 10-1 that is an access destination control device.

The control device 10-2 that is an inquiry source device designates the first label name "Velocity1" and inquires of the path information generating device 300 about path information (step S301).

Upon receiving the first label name, the path information generating unit 305 of the path information generating device 300 identifies the first control device corresponding to the first label name (step S302). For example, when the first label name is "Velocity1", the path information generating unit 305 identifies the control device 10-1 associated with "Velocity1" as the access destination control device 10.

When the second label name which is a label name of the second control device 10 is not designated by the inquiry source device, the path information generating unit 305 determines that the inquiry source device is the access source control device 10 (step S303). In the example of FIG. 13, since the inquiry source device is the control device 10-2, the path information generating unit 305 determines that the control device 10-2 is the access source control device 10.

Then, using the system configuration information stored in the system configuration information storage unit 102, the path information generating unit 305 generates path information indicating a path from the access source control device 10-2 to the first control device 10-1 corresponding to the first label name (step S304). Once the path information is generated, the path information generating unit 305 writes the generated path information in the control device 10-2 that is an inquiry source device via the communication unit 104 (step S305).

The control device 10-2 performs memory access to the control device 10-1 using the written path information (step S306).

According to the third embodiment, in response to the control device 10 designating the first label name to make an inquiry without designating the second label name, path information in which an inquiry source device is regarded as the access source control device 10 and the control device 10 corresponding to the designated label name is regarded as the access destination control device 10 is generated. The generated path information is then written in the inquiry source device. The control device 10 has information about the label name of an access destination control device to which the control device 10 itself performs memory access. Therefore, the above-described configuration enables each control device 10 constituting the control system 501 to perform memory access by inquiring of the path information generating device 300 about path information.

Fourth Embodiment

Figure 14:
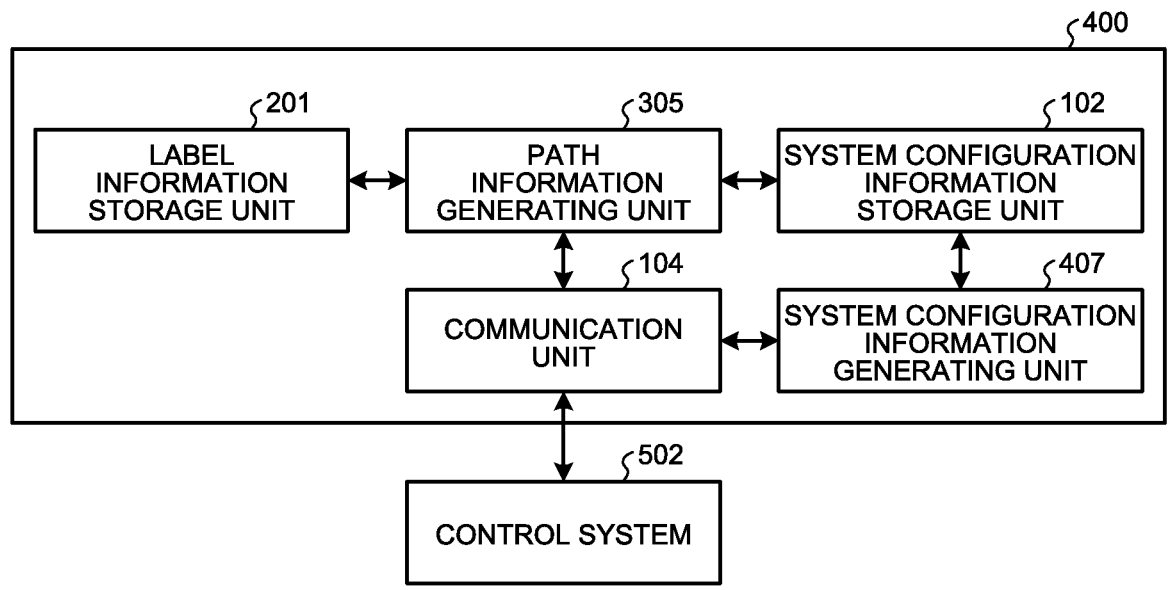
FIG. 14 is a diagram illustrating a functional configuration of a path information generating device according to a fourth embodiment of the present invention.

FIG. 14 is a diagram illustrating a functional configuration of a path information generating device according to the fourth embodiment of the present invention. The path information generating device 400 according to the present embodiment has a function of generating system configuration information. The path information generating device 400 includes the label information storage unit 201, the system configuration information storage unit 102, the communication unit 104, the path information generating unit 305, and a system configuration information generating unit 407. The path information generating device 400 is coupled to a control system 502 via a communication network.

The system configuration information generating unit 407 generates system configuration information based on the information collected from the control devices 10 included in the control system 502. Specifically, the system configuration information generating unit 407 collects device connection information which indicates a communication network to which each control device 10 is connected, from each of the control devices 10 included in the control system 502. The system configuration information generating unit 407 then generates system configuration information from the collected device connection information.

Figure 15:
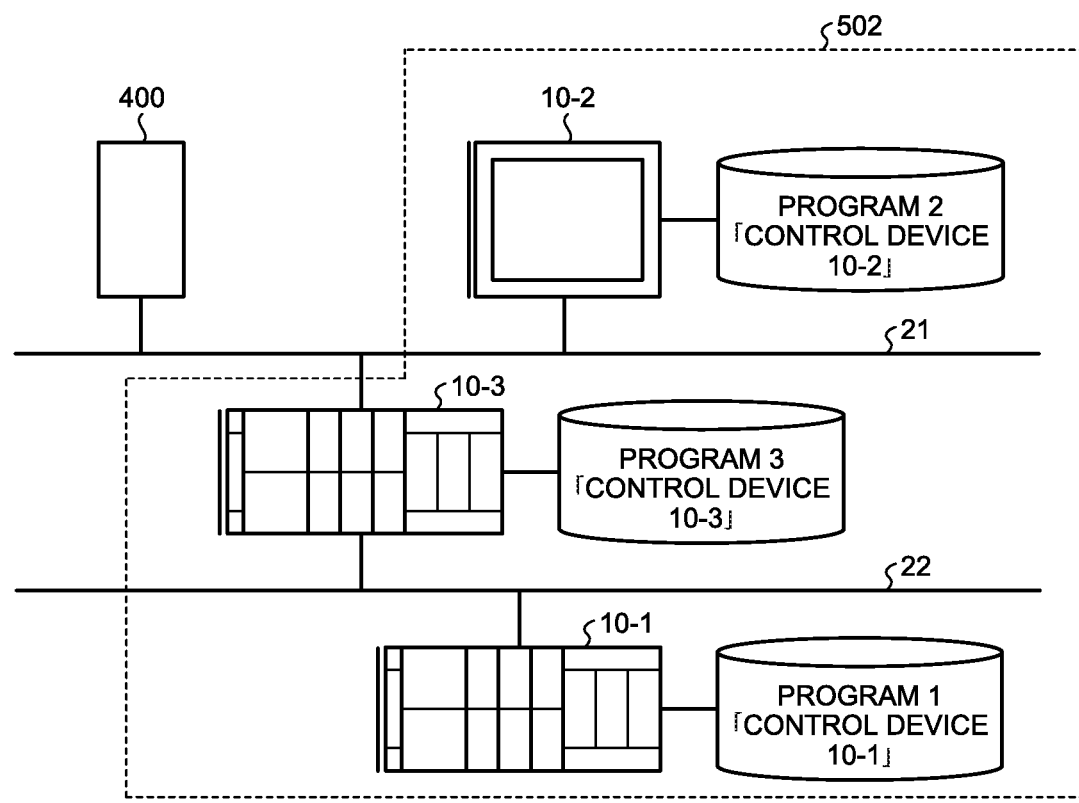
FIG. 15 is a diagram schematically illustrating a configuration of a control system illustrated in FIG. 14.

FIG. 15 is a diagram schematically illustrating a configuration of the control system illustrated in FIG. 14. The control system 502 includes the control device 10-1, the control device 10-2, and the control device 10-3. The control device 10-1 is connected to the communication network 22. The control device 10-2 is connected to the communication network 21. The control device 10-3 is connected to the communication network 21 and the communication network 22. The control device 10-1 stores a program 1 in which the operation of the control device 10-1 is described and identification information of the control device 10-1. The control device 10-2 stores a program 2 in which the operation of the control device 10-2 is described and identification information of the control device 10-2 is described. The control device 10-3 stores a program 3 in which the operation of the control device 10-3 is described and identification information of the control device 10-3. Each of the control devices 10-1, 10-2, and 10-3 generates device connection information in which information indicating the communication network(s) to which the control device is connected is associated with the identification information of the control device, and broadcasts the device connection information on the communication network(s) to which the control device is connected. When each of the control devices 10-1, 10-2, and 10-3 receives the device connection information broadcast by another control device, the control device adds its own device connection information to the received device connection information to broadcast a result of the addition.

Figure 16:
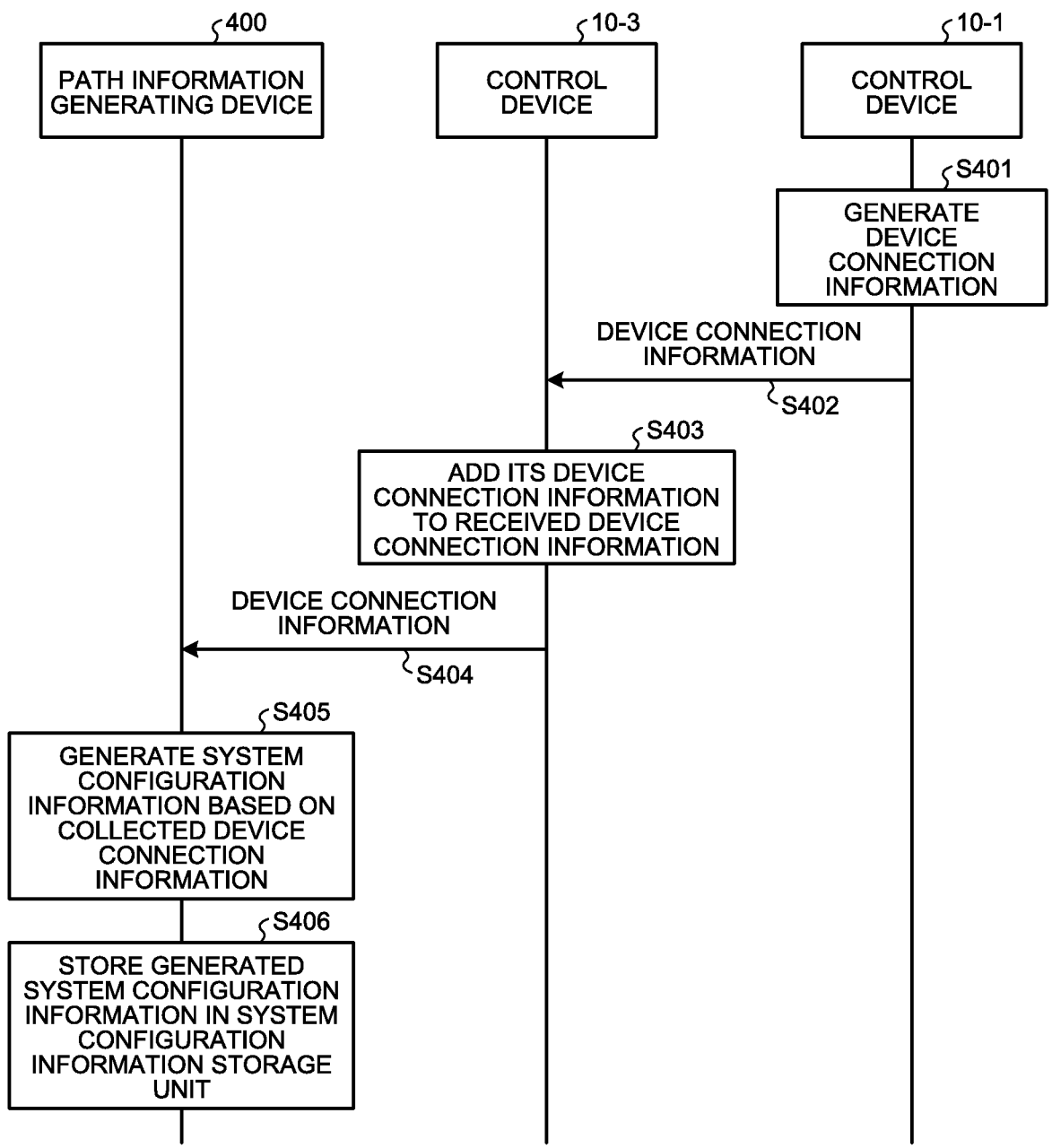
FIG. 16 is a sequence diagram for explaining the operation of generating system configuration information in the fourth embodiment.

FIG. 16 is a sequence diagram for explaining the operation of generating system configuration information in the fourth embodiment. The control device 10-1 generates device connection information indicating that the control device 10-1 is connected to the communication network 22 (step S401). The control device 10-1 broadcasts the generated device connection information on the communication network 22 (step S402). Since the control device 10-3 is connected to the communication network 22, the control device 10-3 receives the information broadcast by the control device 10-1. The control device 10-3 adds its own device connection information to the received device connection information (step S403). Specifically, the control device 10-3 receives, from the control device 10-1, device connection information "control device 10-1→communication network 22" indicating that the control device 10-1 is connected to the communication network 22. Since the control device 10-3 is connected to the communication network 21 and the communication network 22, the control device 10-3 adds device connection information "communication network 22→control device 10-3→communication network 21" of the control device 10-3 to the received device connection information. As a result, device connection information "control device 10-1→communication network 22→control device 10-3→communication network 21" is generated. The control device 10-3 broadcasts the device connection information obtained as a result of step S403 on the communication network 21 (step S404).

Since the path information generating device 400 is connected to the communication network 21, the path information generating device 400 receives the device connection information broadcast by the control device 10-3. The system configuration information generating unit 407 of the path information generating device 400 generates system configuration information based on the collected device connection information (step S405). Although not shown in FIG. 16, the control device 10-2 similarly generates device connection information "control device 10-2→communication network 21" and broadcasts the device connection information on the communication network 21. By so doing, the system configuration information generating unit 407 can generate system configuration information indicating the configuration of the control system 502 illustrated in FIG. 15. The system configuration information generating unit 407 stores the generated system configuration information in the system configuration information storage unit 102 (step S406).

According to the fourth embodiment of the present invention, the user does not need to manually create system configuration information, and so the time and effort required to generate path information can be further reduced, and accurate system configuration information can be generated.

The configurations described in the above-described embodiments cover examples of the contents of the present invention. The configurations can be combined with other publicly known techniques, and can be partially omitted and/or modified without departing from the scope of the present invention. The configurations described in the above embodiments can also be combined with any combination thereof.

For example, although the third embodiment has both the function of generating path information using the first label name and the second label name and the function of generating path information using the first label name and information for identifying the inquiry source device, the present invention is not limited to this example. For example, the path information generating device 300 may not have the function of generating path information using the first label name and the second label name.

The hardware configuration of the path information generating device 100 described in the first embodiment is also employed in the second to fourth embodiments. For example, the functions of the label information storage unit 201, the path information generating unit 205, the path information generating unit 305, the path information generating unit 405, and the system configuration information generating unit 407 can be realized by the processor 111 executing a computer program stored in the memory 110.

REFERENCE SIGNS LIST 10, 10-1, 10-2, 10-3 control device; 21, 22, 206 communication network; 30 programming device; 100, 200, 300, 400 path information generating device; 101, 201 label information storage unit; 102 system configuration information storage unit; 103 input unit; 104 communication unit; 105, 205, 305 path information generating unit; 407 system configuration information generating unit; 110 memory; 111 processor; 112 input device; 113 communication device; 500, 501, 502 control system.

The invention claimed is:

1. A control system comprising:
a programming device to store a program for operating control devices, the program having label names used as variables, to extract, from the program, a first label name for designating an access destination and a second label name for designating an access source, and to designate the extracted first label name and the extracted second label name to inquire about path information; and
a path information generating device including: a label information storage unit to store label information indicating correspondence relations between the label names and the control devices; a system configuration information storage unit to store system configuration information indicating correspondence relations between the control devices and networks connected to the control devices; and a path information generating unit to receive the first label name and the second label name from the programming device in which the program is stored, to identify a first control device corresponding to the first label name and a second control device corresponding to the second label name based on the label information, to generate path information indicating a path from the second control device to the first control device based on the system configuration information, and to output the generated path information to the programming device.

2. The control system according to claim 1, wherein the label information stored in the label information storage unit includes the label information in which two or more label names are associated with one of the control devices.

3. The control system according to claim 2, wherein the path information generating device further comprises a system configuration information generating unit to collect, from two or more control devices coupled to the path information generating device via a communication network, information indicating a communication network to which each of the control devices is connected, to generate the system configuration information from the collected information, and to store the system configuration information in the system configuration information storage unit.

4. The control system according to claim 1, wherein the path information generating device further comprises a system configuration information generating unit to collect, from two or more control devices coupled to the path information generating device via a communication network, information indicating a communication network to which each of the control devices is connected, to generate the system configuration information from the collected information, and to store the system configuration information in the system configuration information storage unit.

5. A path information generating method comprising:
a step of extracting, by a programming device to store a program for operating control devices, the program having label names used as variables, a first label name for designating an access destination and a second label name for designating an access source from the program;
a step of inquiring, by the programming device, of a path information generating device about path information indicating a path from the access source to the access destination using the extracted first label name and the extracted second label name;
a step of identifying, by the path information generating device, a first control device corresponding to the first label name based on label information indicating correspondence relations between label names and control devices;
a step of identifying, by the path information generating device, a second control device corresponding to the second label name based on the label information;
a step of generating, by the path information generating device, path information indicating a path from the second control device to the first control device;
a step of outputting, by the path information generating device, the path information generated, to the programming device; and
a step of writing, by the programming device, in the second control device, the path information outputted by the path information generating device.

6. A control system comprising:
a control device to store a program for operation with label names being used as variables, to extract, from the program, a first label name for designating an access destination and a second label name for designating an access source, and to designate the extracted first label name and the extracted second label name to inquire about path information; and a path information generating device including: a label information storage unit to store label information indicating correspondence relations between the label names and control devices; a system configuration information storage unit to store system configuration information indicating correspondence relations between the control devices and networks connected to the control devices; and a path information generating unit to receive the first label name and the second label name, to identify a first control device corresponding to the first label name and a second control device corresponding to the second label name based on the label information, to generate path information indicating a path from the second control device to the first control device based on the system configuration information, and to output the generated path information to the control device.

7. The control system according to claim 6, wherein the label information stored in the label information storage unit includes the label information in which two or more label names is associated with one of the control devices.

8. The control system according to claim 7, wherein the path information generating device further includes a system configuration information generating unit to collect, from two or more control devices coupled to the path information generating device via a communication network, information indicating a communication network to which each of the control devices is connected, to generate the system configuration information from the information collected, and to store the system configuration information in the system configuration information storage unit.

9. The control system according to claim 6, wherein the path information generating device further includes a system configuration information generating unit to collect, from two or more control devices coupled to the path information generating device via a communication network, information indicating a communication network to which each of the control devices is connected, to generate the system configuration information from the information collected, and to store the system configuration information in the system configuration information storage unit.

10. A path information generating method comprising:
- a step of extracting, by a control device to store a program for operation with label names being used as variables, a first label name for designating an access destination and a second label name for designating an access source from the program;
- a step of inquiring, by the control device, of a path information generating device about path information indicating a path from the access source to the access destination using the extracted first label name and the extracted second label name;
- a step of identifying, by the path information generating device, a first control device corresponding to the first label name based on label information indicating a correspondence between the label names and control devices;
- a step of identifying, by the path information generating device, a second control device corresponding to the second label name based on the label information;
- a step of generating, by the path information generating device, path information indicating a path from the second control device to the first control device; and
- a step of writing, by the path information generating device, the generated path information in the second control device.

* * * * *